United States Patent
Shah et al.

(10) Patent No.: US 9,942,090 B2
(45) Date of Patent: Apr. 10, 2018

(54) PREDICTING ONE OR MORE SYSTEM LOSS EVENTS AND PROACTIVE SYSTEM RECOVERY

(71) Applicant: QUALCOMM Incorporated, San Diego, CA (US)

(72) Inventors: Chintan Shirish Shah, San Diego, CA (US); Seyed Ali Ahmadzadeh, San Diego, CA (US); Aziz Gholmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/493,645

(22) Filed: Sep. 23, 2014

(65) Prior Publication Data

US 2016/0087831 A1    Mar. 24, 2016

(51) Int. Cl.
*H04W 24/04* (2009.01)
*H04L 12/24* (2006.01)
*H04W 24/08* (2009.01)
*H04W 4/02* (2018.01)

(52) U.S. Cl.
CPC .......... *H04L 41/069* (2013.01); *H04W 4/021* (2013.01); *H04W 24/04* (2013.01); *H04W 24/08* (2013.01)

(58) Field of Classification Search
CPC .... H04L 41/069; H04W 4/021; H04W 24/08; H04W 24/04
USPC ...... 455/424, 423, 421, 425, 428, 13.1, 11.1
See application file for complete search history.

(56) References Cited

U.S. PATENT DOCUMENTS

| | | | |
|---|---|---|---|
| 2003/0040331 A1 | 2/2003 | Zhao | |
| 2005/0009521 A1* | 1/2005 | Preece | H04W 88/02 455/435.1 |
| 2008/0246656 A1* | 10/2008 | Ghazarian | G08B 25/016 342/357.54 |
| 2010/0124200 A1 | 5/2010 | Ergen et al. | |

(Continued)

OTHER PUBLICATIONS

"3rd Generation Partnership Project; Technical Specification Group Radio Access Network; Evolved Universal Terrestrial Radio Access (E-UTRA); Mobility enhancements in heterogeneous networks (Release 11) ", 3GPP Standard; 3GPP TR 36.839, 3rd Generation Partnership Project (3GPP), Mobile Competence Centre; 650, Route Des Lucioles ; F-06921 Sophia-Antipolis Cedex; France, vol. RAN WG2, No. V11.0.0, Sep. 19, 2012 (Sep. 19, 2012), pp. 1-53, XP050649237, [retrieved on Sep. 19, 2012].

(Continued)

*Primary Examiner* — Kamran Afshar
*Assistant Examiner* — Farid Seyedvosoghi
(74) *Attorney, Agent, or Firm* — Patterson & Sheridan, L.L.P.

(57) ABSTRACT

Certain aspects of the present disclosure generally relate to wireless communications and, more particularly, to predicting a system loss event and/or proactive system recovery. Aspects of the present disclosure relate to techniques and apparatus for system loss event (e.g., radio link failure event) geo-coding and proactive system recovery. According to certain aspects, a user equipment (UE) may generate and store information about one or more system loss events associated with the UE. The UE may then predict one or more other system loss events associated with the UE based on this information and take action, based on the prediction to continue communication of the UE.

30 Claims, 5 Drawing Sheets

(56) References Cited

U.S. PATENT DOCUMENTS

| | | | | |
|---|---|---|---|---|
| 2011/0244869 | A1* | 10/2011 | Olofsson | H04W 24/02 |
| | | | | 455/442 |
| 2012/0220290 | A1* | 8/2012 | Awad | H04M 3/2227 |
| | | | | 455/423 |
| 2012/0309398 | A1 | 12/2012 | Watanabe | |
| 2013/0114446 | A1* | 5/2013 | Liu | H04W 24/10 |
| | | | | 370/252 |
| 2013/0331077 | A1* | 12/2013 | Mucke | H04W 76/06 |
| | | | | 455/418 |
| 2014/0023032 | A1 | 1/2014 | Kim et al. | |
| 2014/0064103 | A1 | 3/2014 | Dimou et al. | |
| 2014/0099967 | A1* | 4/2014 | Egner | H04W 4/028 |
| | | | | 455/452.2 |
| 2014/0120930 | A1* | 5/2014 | Harris | H04W 24/08 |
| | | | | 455/452.1 |

OTHER PUBLICATIONS

International Search Report and Written Opinion—PCT/US2014/057109—ISA/EPO—dated May 13, 2015.

\* cited by examiner

| |
|---|
| Downlink earFCN |
| Physical Cell ID |
| Band |
| ➤ Bandwidth |
| ➤ PLMN list from SIB1 |
| ➤ PLMN selected for full-service camping,<br>➤ First PLMN in SIB1 list for limited-service camping |
| ➤ PLMN index in the SIB1 PLMN list of the PLMN selected for full-service camping,<br>➤ 0 for limited-service camping |
| ➤ Index of SIB1 in the SIB database |
| ➤ Global Cell ID |
| ➤ Tracking Area update |
| ➤ Barring Status |
| ➤ Timestamp |
| ➤ TDD/FDD information |

| Downlink earFCN |
| --- |
| PLMN |
| Physical Cell ID |
| ➢ Tracking Area code |
| ➢ Bandwidth |
| ➢ Global Cell ID |
| ➢ TDD/FDD information |
| ➢ Barring Status |
| ➢ GPS information |
| ➢ Mobility Info (Low/Med/High) |
| ➢ Occurrence_Count |
| ➢ Last_Occurrence |

PREDICTING ONE OR MORE SYSTEM LOSS EVENTS AND PROACTIVE SYSTEM RECOVERY

TECHNICAL FIELD

Certain aspects of the present disclosure generally relate to wireless communications and, more particularly, to techniques and apparatus for predicting one or more system loss events and proactive system recovery.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

SUMMARY

Certain aspects of the present disclosure provide a method for wireless communications. The method generally includes generating and storing, at a user equipment (UE), information about one or more system loss events associated with the UE, predicting, based on the information, one or more other system loss events associated with the UE, and taking action based on the prediction to continue communication of the UE.

Certain aspects of the present disclosure provide an apparatus for wireless communications. The apparatus generally includes a processor configured to generate and store, at the apparatus, information about one or more system loss events associated with the apparatus, predict, based on the information, one or more other system loss events associated with the apparatus, and take action based on the prediction to continue communication of the apparatus, and a memory coupled to the processor.

Certain aspects of the present disclosure provide an apparatus for wireless communications. The apparatus generally includes means for generating and storing, at the apparatus, information about one or more system loss events associated with the apparatus, means for predicting, based on the information, one or more other system loss events associated with the apparatus, and means for taking action based on the prediction to continue communication of the apparatus.

Certain aspects of the present disclosure provide a computer-readable medium having instructions executable by a computer stored thereon. The instructions are generally capable for generating and storing, at a user equipment (UE), information about one or more system loss events associated with the UE, predicting, based on the information, one or more other system loss events associated with the UE, and taking action based on the prediction to continue communication of the UE.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Aspects of the present disclosure relate to predicting one or more system loss events at a user portable device and responding to the prediction. The user may be configured to learn in advance about one or more possible system loss events and react accordingly if one or more system loss events are predicted. In an aspect of the present disclosure, the user may generate and store a database with information about previous system loss events (e.g., information related to geographical locations of the system loss events). Based on this information, the user may predict an impending system loss event, and make efforts to take and/or take an appropriate action (e.g., before the predicted system loss occurs).

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
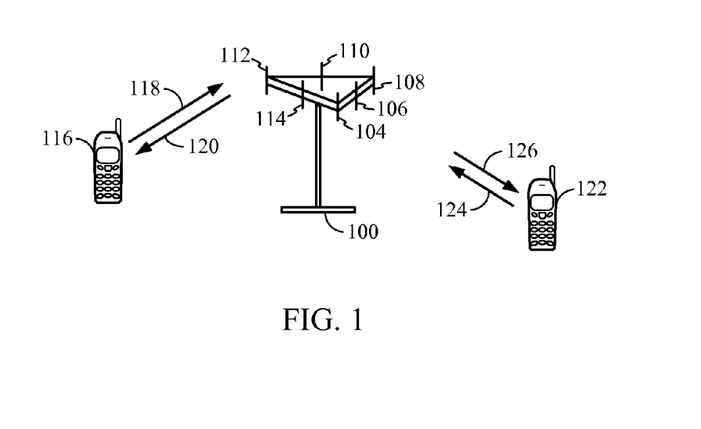
FIG. 1 illustrates a multiple access wireless communication system, according to aspects of the present disclosure.

Referring to FIG. 1, a multiple access wireless communication system is illustrated, in which aspects of the present disclosure may be practiced. For example, a user equipment (UE), also referred to as an access terminal (AT) (e.g., AT 116 and AT 122 from FIG. 1), may be configured to generate and store information about one or more system loss events associated with the AT (e.g., loss of communication with an access point 100), predict, based on this information, one or more other (future) system loss events associated with the AT, and take action based on the prediction.

The access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. AT 116 is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access point. In the embodiment, antenna groups are each designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an AP using beamforming to transmit to access terminals scattered randomly through its coverage causes less interference to access terminals in neighboring cells than an access point transmitting through a single antenna to all its access terminals.

An AP may be a fixed station used for communicating with the terminals and may also be referred to as an access point, a Node B, base station, evolved Node B (eNB) or some other terminology. An AT may also be called an access terminal, user equipment (UE), a wireless communication device, terminal, mobile station or some other terminology.

Figure 2:
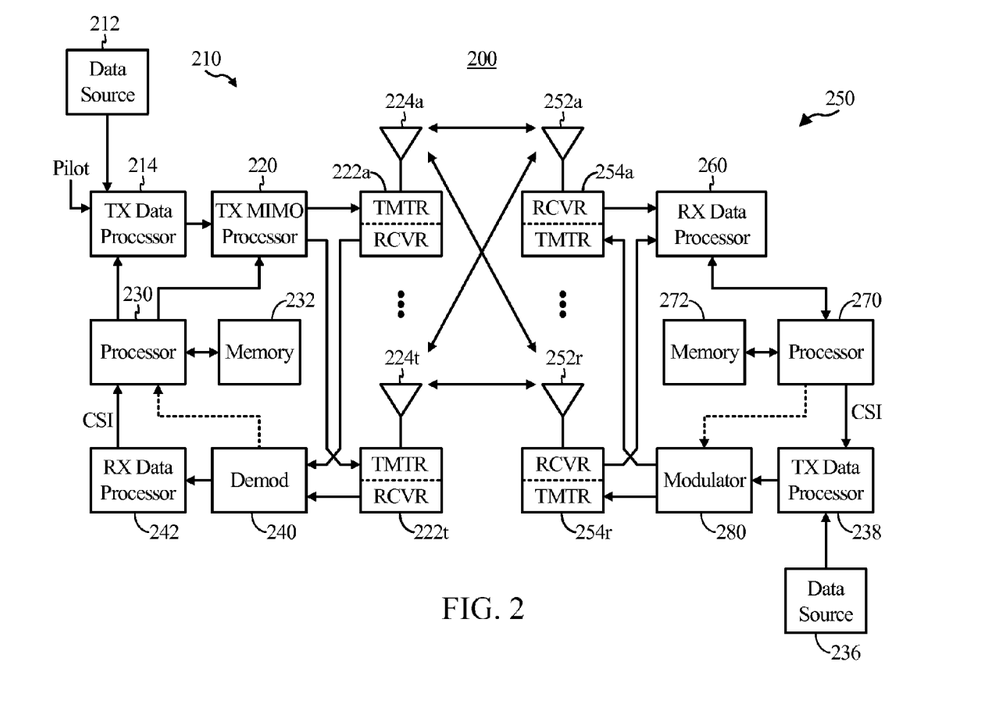
FIG. 2 is a block diagram of a communication system, according to aspects of the present disclosure.

Referring to FIG. 2, a block diagram of an embodiment of a transmitter system 210 (also known as an AP) and a receiver system 250 (also known as an AT) in a MIMO system 200 is illustrated, in which aspects of the present disclosure may be practiced. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system 250 to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions, from memory 232, performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

According to aspects, the controllers/processors 230 and 270 may direct the operation at the transmitter system 210 and the receiver system 250, respectively. The memories 232 and 272 may store data and program codes for the transmitter system 210 and the receiver system 250, respectively.

Figure 5:
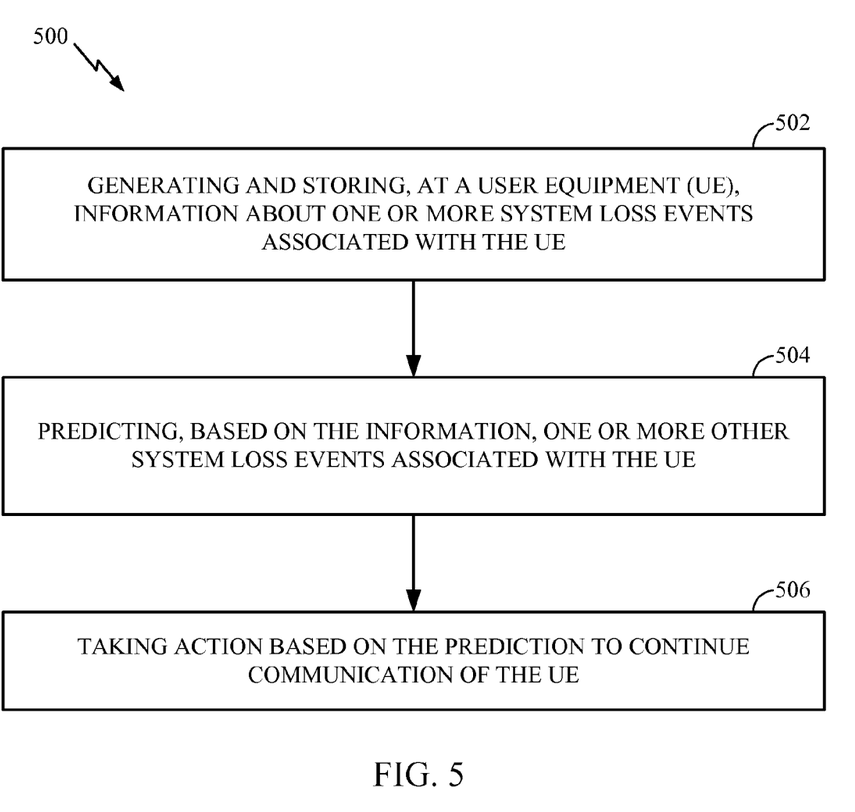
FIG. 5 illustrates example operations that may be performed by a user equipment (UE), in accordance with aspects of the present disclosure.

According to certain aspect of the present disclosure, the controller/processor 270, and/or other processors and modules at the receiver system 250 may perform or direct operations 500 in FIG. 5 and/or other processes for the techniques described herein. For example, the processor 270 may be configured to generate and store information about one or more system loss events associated with the receiver system 250 (e.g., loss of communication with the transmitter system 210), predict, based on this information, one or more other (future) system loss events associated with the receiver system 250, and take action based on the prediction. However, any component and/or processor in FIG. 2 may perform the processes for the techniques described herein.

Geo-Coding and/or Prediction of One or More System Loss Events

Aspects of the present disclosure relate to predicting one or more system loss events at a UE and responding to the prediction by taking an appropriate action before such system loss events occur. In an aspect of the present disclosure, the UE may collect information about one or more previous system loss events (e.g., geographical locations or geo-codes of system loss events). The UE may be configured to predict, based on this information, one or more impending system loss events, and proactively respond to the prediction in order to avoid a system loss.

In some multi-SIM and multi-RAT technologies (e.g., technologies based on utilizing multiple subscriber identification modules (SIMs) and radio access technologies (RATs) at a single UE), it has been observed that the UE (e.g., the access terminal 250 from FIG. 2) sequentially searches for the RAT it was camped on even though another RAT may be available. This approach leads to slower service recovery times and more current (or power) consumption. Also, currently, the UE cannot predict any system loss event. Such a prediction would be very useful especially in multi-RAT technologies where additional radio frequency (RF) resources to search for alternative systems may be available. Aspects of the present disclosure present prediction methods, for example, via geo-coding of a history of system loss events, such as Out of Service (OOS) or radio link failures (RLFs), encountered by the UE (e.g., most frequent RLFs).

Some algorithms utilized at UEs (e.g., OOS algorithms) seek to first acquire the system/RAT on which the system loss event occurred. In doing so, a UE would search all the bands and frequencies associated and provisioned for the given RAT.

This search process is usually expensive in terms of power (e.g., current consumption). For example, scanning four LTE bands for CMCC (China Mobile Communications Corporation) takes approximately 13 seconds, which would consume considerable power resources. The scanning of LTE bands is also sub-optimal. For example, if a usable frequency is located at the end of the band scan (e.g., a last Absolute Radio Frequency Channel Number (ARFCN) represents the $4^{th}$ LTE band of CMCC), the UE may still scan the other three bands. This may contribute to poor user experience, wherein a user may have to wait a longer period of time to obtain Packet Switched (PS) or Circuit Switched (CS) service. The prolonged scanning also consumes more power.

If the UE fails to find this system/RAT, it then proceeds to look for a suitable/useful system defined within its given geographical location (e.g., as specified by entities such MRU (Most Recently Used), PRL (Preferred Roaming List), equi-PRL, USIM (Universal Subscriber Identity Module), and so on). The same sub-optimality described above applies here, and it translates across RATs. If all the above fails, which usually happens after extensive band scans, then the UE begins to look for roaming systems.

In order to conserve power consumption during OOS searches, designs employ telescoping of OOS, e.g., scanning for a usable frequency is performed less frequently. This approach works well in conserving dissipated power, but the penalty paid is delayed service capabilities to the end user. This trade-off between aggressive searches to restore service and telescoping to save power makes it extremely difficult if not impossible to meet the above requirements, e.g., faster restoration of service at low current consumption. Meeting both would be considered preferred.

In addition to the sub-optimal behavior of the UE OOS algorithm described above, the algorithms also have limitations in that they do not have any notion or information about UE's geographical location or UE's relative location (e.g., relative to network deployment and cells). It can be observed as well that many (not all) system loss events occur based on a pattern. Most people have a pattern defined to their regular lives. For example, most people follow the same route from home to work place and vice-versa. Even in indoor scenarios like parking structures, people tend to park in same/similar spots and lead the same path to their office location. If the UE experiences a system loss event in such a route/location, it is expected with a high probability that it will encounter a system loss event in a proximate or same location the next time the UE is in this vicinity of such a location.

Some OOS algorithms do not take advantage of such repeated user behavior. They implicitly take advantage of the successful ARFCNs the UE has camped on, e.g., via an entity called acquisition database (ACQ DB), but they typically do not take full (or direct) advantage. In other words, conventional UEs tend to not be self-learning.

In addition, some OOS algorithms and PHY/MAC (Physical/Media Access Control) layer algorithms are not able to predict the occurrence of RLF. This is unfortunate, as being able to predict the occurrence of RLF might be especially useful in repetitive scenarios as described above (e.g., scenarios associated with a pattern of user behavior). Given the pattern described previously, aspects of the present disclosure may help effectively predict an LTE RLF, allowing a UE to utilize RLF recovery mechanisms prior to the actual occurrence of the RLF.

As noted above, some designs may not effectively achieve a trade-off between faster time to service post OOS/RLF event and power consumption. In other words, very little intelligence may be built into conventional designs, such that conventional UEs may not be self learning. Instead, conventional UEs tend to operate in a sequential manner (e.g., operating on one RAT at a time) when searching a suitable cell. In addition, conventional UEs do not have information about a geographical location of a system loss event (such as RLF) and, thus, are not capable of effectively using such information later (e.g., in the event of repetitive RLF events).

According to certain aspects of the present disclosure, an impending system loss event such as an RLF may be first detected via standardizing system timers. In an aspect, Global Positioning System (GPS) coordinates of any system loss event may be stored if such timers expire. In addition, a sequence of cells that the UE encountered on its way to the system loss event may be stored in a database. For example, both Cell Identifier (Cell ID) and other related information to uniquely identify a cell as well as the GPS coordinates of such a cell sequence may be stored. Aspects of the present disclosure exploit the fact that, due to human behavior, many RLF events occur on the same route. Hence, the next time the UE encounters a system loss timer, it may associate or correlate both the cell sequence and the GPS coordinates of the current serving cell (e.g., it may proactively turn on a GPS receiver) with a sequence of cell IDs and GPS coordinates stored in a database based on one or more previous system loss events such as RLFs. In an aspect of the present disclosure, if the UE predicts a system loss event, it can use alternative RF resources to look for suitable systems while one of the RATs is still undergoing supervision process. Solutions for a system loss event (e.g., RLF) presented in the present disclosure may provide power improvement at a UE, for example, by providing shorter search periods, searching when RF/modem chip is already on and in-use, and/or achieving minimal current penalty. In addition, the techniques presented herein may help provide improved user experience because of a quicker response to a system loss event by allowing accurate prediction of such an event, for example by geo-coding, and/or pre-emptive strategies.

As described above, user behavior often follows some regular pattern. As an example, a user often travels a similar path and, as a result, tends to visit the same cells. User behaviors happen repeatedly at the similar time periods. The important system loss events (e.g., RLF and OOS events) are those that happen frequently. OOS loss event due to deployment issues are limited to specific areas.

According to certain aspects of the present disclosure, a user may learn about possible OOS and/or RLF events and reacts accordingly. In the case of reactive response, a user may learn from past OOS/RLF events and records, and use the solution of each event (e.g., acquired RAT, PLMN (Public Land Mobile Network), ARFCN) in case a similar event is observed.

According to certain aspects of the present disclosure, a proactive response (e.g., via the system loss event prediction) may be performed for accuracy via geo-coding of one or more previous system loss events, e.g., via determining and storing latitude-longitude and timing information of prior system loss events as well as unique identifications of corresponding serving cells. In other words, the location of such one or more system loss events may be geo-coded (e.g., information regarding the location or other indicative parameters, such as time, may be stored at a UE).

In some cases, when a system loss timer starts (e.g., the timer T310 in LTE/TDS systems), a UE may turn on a GPS receiver to start monitoring latitude-longitude information and/or a speed of the UE. In addition, one or more cells that the UE encounters may be located. If a system loss event actually occurs (e.g., the system loss timer expires), a geo-code of the UE (e.g., latitude-longitude information) may be stored in a database at the UE, as well as a sequence of encountered cells. In some cases, the database may be scalable, for example, allowing for a defined number of GPS coordinates to be stored in the database.

The next time the UE encounters a potential system loss (e.g., the timer T310 starts again), the UE may query the database for a cell pattern encountered in any previous system loss events (e.g., OOS/RLF events). As a result, if a cell pattern is matched, the GPS receiver at the UE may be turned on for determining geographical location of the UE (e.g., latitude/longitude of the UE). In an aspect, the determined geographical location may be associated or correlated with the geo-coded location of a system loss event, for example, within a margin of error (e.g., 0.5 miles).

Under normal operation, a UE may not be required to turn on the GPS receiver unless a user or an application invokes it. In some cases, however, in an event that any of the system loss timers start (e.g., the timer T310 in LTE/TDS), the UE may turn on its GPS receiver. In an aspect of the present disclosure, a margin may be included to a start time of the GPS receiver in case the T310 or equivalent timer is very short and the GPS receiver is in a cold start mode.

In the event that the system loss timer actually expires and a system loss event (e.g., RLF event) occurs, the UE may store the current latitude-longitude information as well as a pre-defined number of prior latitudes-longitudes. In an aspect, this pre-defined number may be configurable, and the latitude-longitude sequence may be used to associate or correlate the travel direction of UE in the future.

Figure 4:
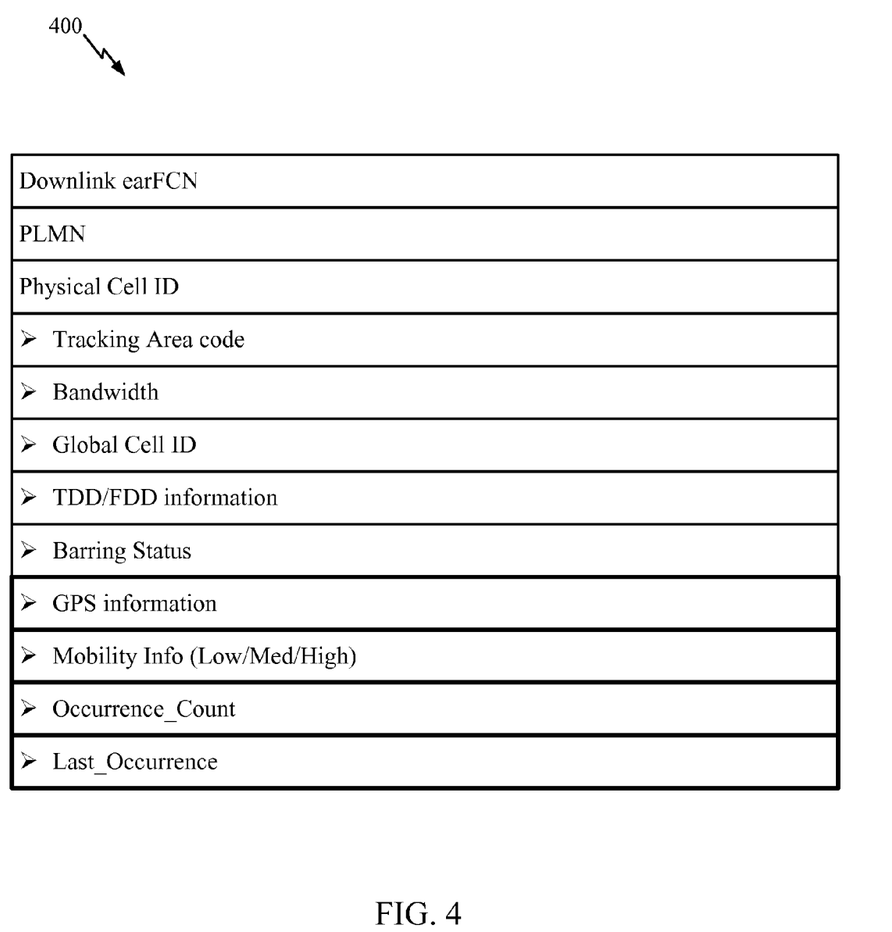
FIG. 4 illustrates an example system loss event (e.g., radio link failure (RLF)) database structure, in accordance with aspects of the present disclosure.

According to aspect of the present disclosure, a UE may store a set of information, such as a triplet of three parameters, that identify a serving cell uniquely. FIG. 4 illustrates an exemplary triplet that may be stored at a UE. As illustrated, the triplet of information may comprise downlink ARFCN, PLMN and Physical Cell ID. The triplet of information may be also utilized to associate or correlate the cell sequence in case of an "impending system loss event like an RLF" in the future.

In accordance with certain aspects of the present disclosure, the next time the UE encounters a system loss timer such as the T310 timer, the UE may associate or correlate the serving cell sequence it encounters with the stored cell sequence in the database. If a match or a partial match is encountered, the UE may invoke the GPS receiver. In an aspect, a partial match can be defined, for example, as x out of y cells matching; where x represents matched cells based on the current serving cell sequence and y is a size of the sequence stored previously (e.g., three for the triplet of information).

In an aspect of the present disclosure, based on UE's current GPS coordinates, the UE may associate or correlate the latitude-longitude sequence with one stored in the database (and associated with a previous OOS/RLF event). If, for example, two cells match, the UE may predict an impending system loss event (e.g., OOS/RLF event). Once a system loss event (e.g., an LTE RLF event) is predicted, as described above, the UE may acquire lock of a secondary RF receiver from LTE. This may be possible due to dual receiver features such as simultaneous LTE (SLTE). In this manner, a secondary RF receiver may be employed by the UE to avoid the system loss event and/or maintain or continue UE communications.

Although, in an LTE system, giving up a lock of diversity receiver may cause a change in link budget for the worse, in some cases, it can be expected with a relatively high confidence (being a function of, for example, thresholds, filter time constants, UE mobility and direction, triplet information, and so on) that the system loss (RLF) event may occur in any case, even in the case when LTE has lock of both receivers. The order of how parameters of the triplet are considered may be important. Much accuracy can be achieved by the use of the GPS receiver and the geo-coded cell sequence in the historical RLF occurrences.

In multi-RAT (and/or multi-SIM) technologies, there may be a second receiver available for use. For example, these types of technologies may have more than one RF transceiver on the chip, which can be used for pro-active searching. In this manner, a diversity receiver may be employed by the UE to avoid the system loss event and/or maintain or continue UE communications. Once the RF lock is released by LTE (e.g., a secondary RF chain at a transceiver of a UE is available for use, while the UE retains the lock on a primary RF chain) or resources are obtained from another transceiver, normal OOS procedures can be followed to look for the solution.

Figure 3:
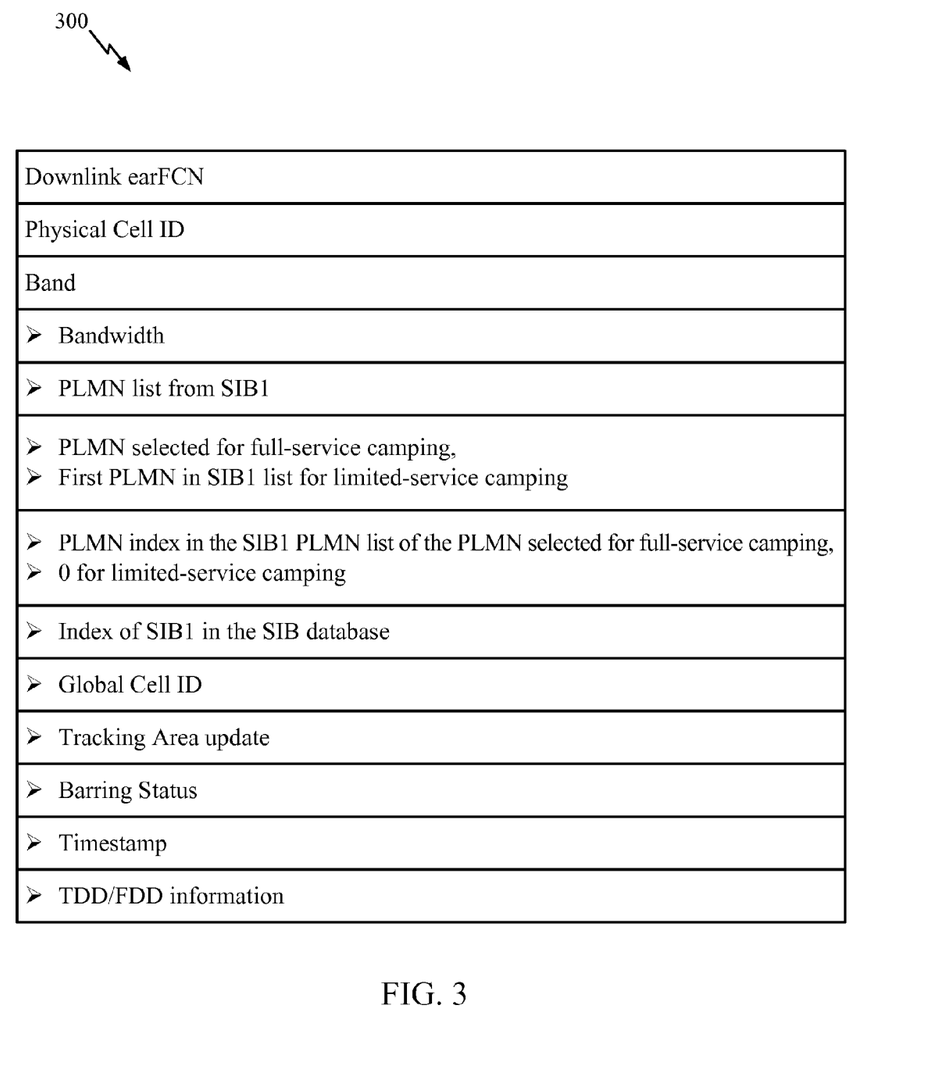
FIG. 3 illustrates an example Long Term Evolution (LTE) acquisition database structure.

FIG. 3 illustrates an example of an LTE acquisition database structure 300. As illustrated, the conventional LTE acquisition database structure may comprise: a Downlink earFCN field, a Physical Cell ID field, and a Band field. The Band field may comprise the following sub-fields: Bandwidth, PLMN list from System Information Block (SIB) 1, PLMN selected for full-service camping, First PLMN in SIB1 list for limited-service camping, PLMN index in the SIB1 PLMN list of the PLMN selected for full-service camping (0 for limited-service camping), Index of SIB1 in the SIB database, Global Cell ID, Tracking Area update, Barring Status, Timestamp, Time-Division Duplex/Frequency-Division Duplex (TDD/FDD) information.

In accordance with aspects of the present disclosure, a UE may generate and/or store additional information related to a system loss event such as an RLF event. For example, such additional information may be stored in the RLF database (DB) generated at the UE and may comprise information about one or more previous system loss (e.g., OOS/RLF) events. In an aspect, this information can be used for limiting the search space for acquisition algorithm when similar events happen again.

In an aspect, each entry in the RLF DB may be identified by a unique serving triplet and GPS coordinates, e.g., the triplet may comprise eARFCN, PLMN ID, PCI (Physical Cell Identifier). GPS coordinates may be used to identify one or more similar system loss events such as RLF/OOS events occurring in the future. Additionally, the serving triplet may be employed along with the GPS coordinates to identify the one or more similar system loss events.

In an aspect, a number of entries in the RLF DB may be limited. For example, the number of entries in the RLF DB may be similar to the Acquisition DB (e.g., may be equal to 10). In an aspect, RLF DB may comprise some additional information on OOS/RLF events, e.g., OOS/RLF event frequency and OOS/RLF event last occurrence.

FIG. 4 illustrates an example of a system loss event (e.g., RLF) DB structure 400 including system loss event information, in accordance with certain aspects of the present disclosure. In an aspect, as illustrated in FIG. 4, the RLF DB structure 400 may comprise: a Downlink earFCN field, a PLMN field, and a Physical Cell ID (PCI) field. The Physical Cell ID field may further comprise: Tracking Area code sub-field, Bandwidth sub-field, Global Cell ID sub-field, TDD/FDD information sub-field, Barring Status sub-field, GPS information sub-field, UE Mobility Info during system loss event sub-field (e.g., Low/Med/High), system loss event Occurrence_Count sub-field, and system loss event Last_Occurrence sub-field.

Since one of the transceivers is already on, the current (e.g., power dissipation) penalty in case of simultaneous LTE-type architecture may be reduced (e.g., minimal if not negligible). Even in case of the use of a second transceiver, the current penalty (e.g., power dissipation) may be expected to be lower than full search since the Digital Signal Processor (DSP) and other circuitry is already on (e.g., in single Mobile Station Modem (MSM) solutions). Thus, additional current (e.g., power dissipation) penalty for the second transceiver may be tolerated. Time to restore service would be shorter, since a UE is now responding actively to an impending system loss event. For example, a few seconds may be shaved off from service search procedures based on conventional OOS/RLF recovery procedures.

FIG. 5 illustrates example operations 500 for wireless communications that may be performed by a UE, in accordance with aspects of the present disclosure. The operations 500 may begin, at 502, by generating and storing, at the UE, information about one or more system loss events associated with the UE. At 504, one or more other system loss events associated with the UE may be predicted based on the information. At 506, the UE may take action based on the prediction to continue communication of the UE. In an aspect of the present disclosure, taking action based on the prediction to continue communication of the UE includes avoiding the one or more other system loss events associated with the UE. In an aspect of the present disclosure, as discussed above, the information may be stored as entries in a database of the UE.

In an aspect of the present disclosure, prior to generating and storing the information about the one or more system loss events, a GPS receiver of the UE may be turned on, if at least one system loss timer of the UE starts. Then, by using the GPS receiver, at least one of geographical locations or speed of the UE may be monitored. In addition, one or more cells that the UE encounters may be located during this process. If the at least one system loss timer expires and one of the system loss events occurs, a current geographical location of the UE and up to a defined number of prior geographical locations of the UE may be stored. Further-more, information uniquely identifying a serving cell of the UE and information uniquely identifying one or more cells that previously served the UE may be stored.

In an aspect, the defined number of prior geographical locations being stored at the UE may be configurable. A sequence of the defined number of prior geographical locations may be used to associate or correlate a travel direction of the UE in the future. For example, as described above, the information uniquely identifying the serving cell may comprise a triplet of information, such as ARFCN, PLMN ID, and PCI.

In an aspect of the present disclosure, as described above, predicting the one or more other system loss events (e.g., when the at least one system loss timer of the UE starts again) may comprise: associating or correlating a sequence of serving cells the UE encounters with the stored information uniquely identifying the serving cell of the UE and the information uniquely identifying the one or more cells that previously served the UE; invoking the GPS receiver, if a defined number of serving cells match based on the association or correlation; associating or correlating a current sequence of geographical locations of the UE obtained by the invoked GPS receiver with the one or more stored geographical locations at the UE; and predicting the one or more other system loss events, if the associated or correlated geographical locations of the UE match.

In an aspect of the present disclosure, upon predicting the one or more other system loss events, UE may employ a secondary radio frequency (RF) receiver different from a primary RF receiver utilized by the UE before the one or more other system loss events occurred to search for a cell to continue communication of the UE. In another aspect, upon predicting the one or more other system loss events, UE may switch from a primary RF chain to a secondary RF chain within a receiver to search for a cell to continue communication of the UE, wherein the primary RF chain is utilized by the UE before the one or more other system loss events occurred. In an aspect of the present disclosure, as described above, predicting, based on the information, the one or more other system loss events associated with the UE may comprise determining the one or more other system loss events are similar to the stored one or more system loss events, and taking action based on the prediction to continue communication of the UE comprises using the information generated and stored at the UE to limit a search space for an acquisition algorithm of the UE.

Figure 5A:
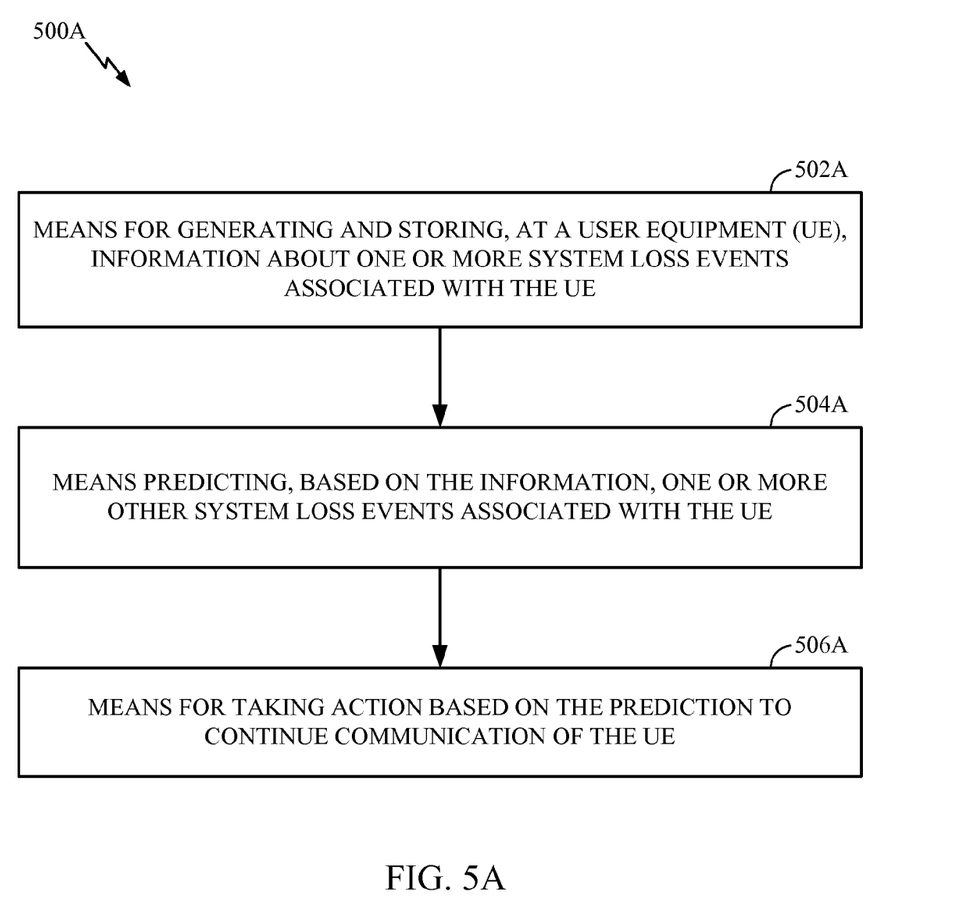
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor, such as the processor 270 of the receiver system 250 (access terminal/user equipment) from FIG. 2. Generally, where there are operations illustrated in figures, those operations may have corresponding counterpart means-plus-function components with similar numbering. For example, operations 500 illustrated in FIG. 5 correspond to means 500A illustrated in FIG. 5A.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication by a user equipment (UE), comprising:
   turning on a Global Positioning System (GPS) receiver of the UE, if at least one system loss timer of the UE starts, the start of the system loss timer indicating an impending system loss event;
   generating and storing, at the UE, information about one or more system loss events associated with the UE based on information obtained by the GPS receiver if the at least one system loss timer expires, the expiration of the system loss timer indicating an occurrence of the system loss event;
   predicting, based on the information stored at the UE, one or more other system loss events associated with the UE; and
   taking action based on the prediction to continue communication of the UE.

2. The method of claim 1, wherein the information is stored as entries in a database of the UE.

3. The method of claim 1, further comprising:
   monitoring, by using the GPS receiver, at least one of geographical locations or a speed of the UE; and
   locating one or more cells that the UE encounters.

4. The method of claim 3, wherein generating and storing the information about the one or more system loss events comprises:
   storing, based on the information obtained by the GPS receiver, a current geographical location of the UE and up to a defined number of prior geographical locations of the UE, if the at least one system loss timer expires and one of the system loss events occurs; and
   storing information uniquely identifying a serving cell of the UE and information uniquely identifying one or more cells that previously served the UE.

5. The method of claim 4, wherein:
   the defined number of prior geographical locations is configurable, and
   a sequence of the defined number of prior geographical locations is used to associate a travel direction of the UE.

6. The method of claim 4, wherein the information uniquely identifying the serving cell comprises an Absolute Radio Frequency Channel Number (ARFCN), a Public Land Mobile Network Identifier (PLMN ID), and a Physical Cell Identifier (PCI).

7. The method of claim 4, wherein predicting the one or more other system loss events comprises:
   associating a sequence of serving cells the UE encounters with the stored information uniquely identifying the serving cell of the UE and the information uniquely identifying the one or more cells that previously served the UE, if the at least one system loss timer of the UE starts again;
   invoking the GPS receiver, if a defined number of serving cells match based on the association;
   associating a current sequence of geographical locations of the UE obtained by the invoked GPS receiver with the one or more stored geographical locations at the UE; and
   predicting the one or more other system loss events, if the associated geographical locations of the UE match.

8. The method of claim 1, wherein taking action based on the prediction comprises:
   upon predicting the one or more other system loss events, employing a secondary radio frequency (RF) receiver of the UE different from a primary RF receiver utilized by the UE before the one or more other system loss events occurred to search for a cell to continue communication of the UE.

9. The method of claim 1, wherein taking action based on the prediction comprises:
   switching, upon predicting the one or more other system loss events, from a primary radio frequency (RF) chain to a secondary RF chain in a receiver of the UE to search for a cell to continue communication of the UE, wherein the primary RF chain is utilized by the UE before the one or more other system loss events occurred.

10. The method of claim 1, wherein:
    predicting, based on the information, the one or more other system loss events associated with the UE comprises determining the one or more other system loss events are similar to the stored one or more system loss events; and
    taking action based on the prediction to continue communication of the UE comprises using the information generated and stored at the UE to limit a search space for an acquisition algorithm of the UE.

11. The method of claim 1, wherein taking action based on the prediction to continue communication of the UE comprises avoiding the one or more other system loss events associated with the UE.

12. A user equipment (UE) for wireless communication, comprising:
    a processor configured to:
        turn on a Global Positioning System (GPS) receiver of the UE, if at least one system loss timer of the UE starts, the start of the system loss timer indicating an impending system loss event;
        generate and store, at the UE, information about one or more system loss events associated with the UE based on information obtained by the GPS receiver if the at least one system loss timer expires, the expiration of the system loss timer indicating an occurrence of the system loss event;
        predict, based on the information, one or more other system loss events associated with the UE; and
        take action based on the prediction to continue communication of the UE; and
    a memory coupled to the processor.

13. The UE of claim 12, wherein the processor is further configured to:
    monitor, by using the GPS receiver, at least one of geographical locations or a speed of the UE; and
    locate one or more cells that the UE encounters.

14. The UE of claim 13, wherein the processor is further configured to:
    store, based on the information obtained by the GPS receiver, a current geographical location of the UE and up to a defined number of prior geographical locations of the UE, if the at least one system loss timer expires and one of the system loss events occurs; and
    store information uniquely identifying a serving cell of the UE and information uniquely identifying one or more cells that previously served the UE.

15. The UE of claim 14, wherein the information uniquely identifying the serving cell comprises an Absolute Radio Frequency Channel Number (ARFCN), a Public Land Mobile Network Identifier (PLMN ID), and a Physical Cell Identifier (PCI).

16. The UE of claim 14, wherein the processor is further configured to:
associate a sequence of serving cells the UE encounters with the stored information uniquely identifying the serving cell of the UE and the information uniquely identifying the one or more cells that previously served the UE, if the at least one system loss timer of the UE starts again;
invoke the GPS receiver, if a defined number of serving cells match based on the association;
associate a current sequence of geographical locations of the UE obtained by the invoked GPS receiver with the one or more stored geographical locations at the UE; and
predict the one or more other system loss events, if the associated geographical locations of the UE match.

17. The UE of claim 12, wherein the processor is further configured to:
employ, upon predicting the one or more other system loss events, a secondary radio frequency (RF) receiver of the UE different from a primary RF receiver utilized by the UE before the one or more other system loss events occurred to search for a cell to continue communication of the UE.

18. The UE of claim 12, wherein the processor is further configured to:
switch, upon predicting the one or more other system loss events, from a primary radio frequency (RF) chain to a secondary RF chain in a receiver of the UE to search for a cell to continue communication of the UE, wherein the primary RF chain is utilized by the UE before the one or more other system loss events occurred.

19. The UE of claim 12, wherein the processor is further configured to:
determine the one or more other system loss events are similar to the stored one or more system loss events; and
use the information generated and stored at the UE to limit a search space for an acquisition algorithm of the UE.

20. The UE of claim 12, wherein the processor is further configured to avoid the one or more other system loss events associated with the UE.

21. A user equipment (UE) for wireless communication, comprising:
means for turning on a Global Positioning System (GPS) receiver of the UE, if at least one system loss timer of the UE starts, the start of the system loss timer indicating an impending system loss event;
means for generating and storing, at the UE, information about one or more system loss events associated with the UE based on information obtained by the GPS receiver if the at least one system loss timer expires, the expiration of the system loss timer indicating an occurrence of the system loss event;
means for predicting, based on the information, one or more other system loss events associated with the UE; and
means for taking action based on the prediction to continue communication of the UE.

22. The UE of claim 21, further comprising:
means for monitoring, by using the GPS receiver, at least one of geographical locations or a speed of the UE; and
means for locating one or more cells that the UE encounters.

23. The UE of claim 22, further comprising:
means for storing, based on the information obtained by the GPS receiver, a current geographical location of the UE and up to a defined number of prior geographical locations of the UE, if the at least one system loss timer expires and one of the system loss events occurs; and
means for storing information uniquely identifying a serving cell of the UE and information uniquely identifying one or more cells that previously served the UE.

24. The UE of claim 23, wherein the information uniquely identifying the serving cell comprises an Absolute Radio Frequency Channel Number (ARFCN), a Public Land Mobile Network Identifier (PLMN ID), and a Physical Cell Identifier (PCI).

25. The UE of claim 23, further comprising:
means for associating a sequence of serving cells the UE encounters with the stored information uniquely identifying the serving cell of the UE and the information uniquely identifying the one or more cells that previously served the UE, if the at least one system loss timer of the UE starts again;
means for invoking the GPS receiver, if a defined number of serving cells match based on the association;
means for associating a current sequence of geographical locations of the apparatus obtained by the invoked GPS receiver with the one or more stored geographical locations at the UE; and
means for predicting the one or more other system loss events, if the associated geographical locations of the UE match.

26. The UE of claim 21, further comprising:
means for employing, upon predicting the one or more other system loss events, a secondary radio frequency (RF) receiver of the UE different from a primary RF receiver utilized by the UE before the one or more other system loss events occurred to search for a cell to continue communication of the UE.

27. The UE of claim 21, further comprising:
means for switching, upon predicting the one or more other system loss events, from a primary radio frequency (RF) chain to a secondary RF chain in a receiver of the UE to search for a cell to continue communication of the UE, wherein the primary RF chain is utilized by the UE before the one or more other system loss events occurred.

28. The UE of claim 21, further comprising:
means for determining the one or more other system loss events are similar to the stored one or more system loss events; and
means for using the information generated and stored at the UE to limit a search space for an acquisition algorithm of the UE.

29. The UE of claim 21, further comprising:
means for avoiding the one or more other system loss events associated with the UE.

30. A non-transitory computer-readable medium having instructions to cause a user equipment (UE) to:
turn on a Global Positioning System (GPS) receiver of the UE, if at least one system loss timer of the UE starts, the start of the system loss timer indicating an impending system loss event;
generate and store, at the UE, information about one or more system loss events associated with the UE based on information obtained by the GPS receiver if the at least one system loss timer expires, the expiration of the system loss timer indicating an occurrence of the system loss event;

predict, based on the information, one or more other system loss events associated with the UE; and
take action based on the prediction to continue communication of the UE.

* * * * *